F. KRUSE.
MEAT PRESSER.
APPLICATION FILED JULY 24, 1919.
1,350,161.
Patented Aug. 17, 1920.
2 SHEETS—SHEET 1.
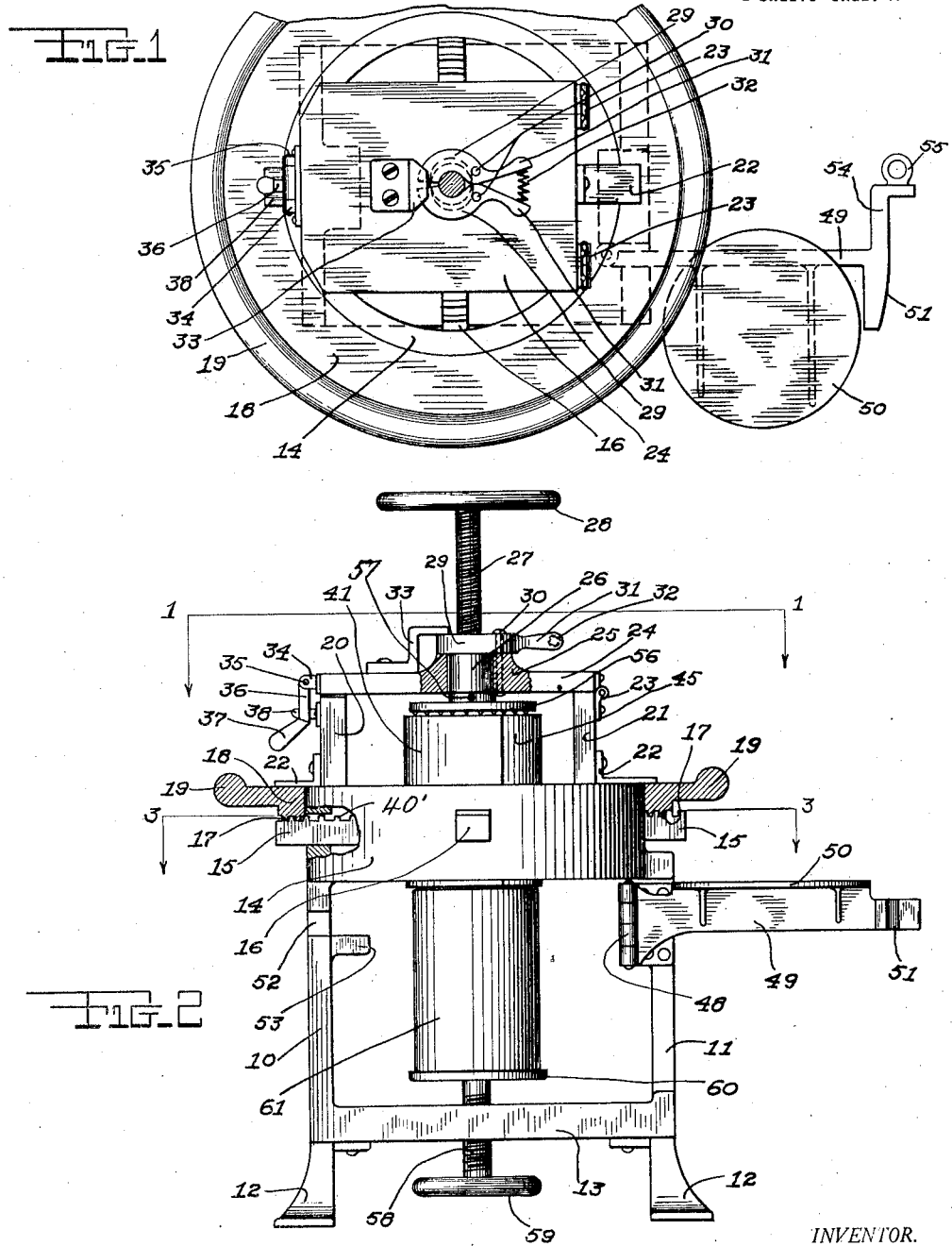
INVENTOR.
Ferdinand Kruse
BY
ATTORNEY.

F. KRUSE.
MEAT PRESSER.
APPLICATION FILED JULY 24, 1919.
1,350,161. Patented Aug. 17, 1920.
2 SHEETS—SHEET 2.
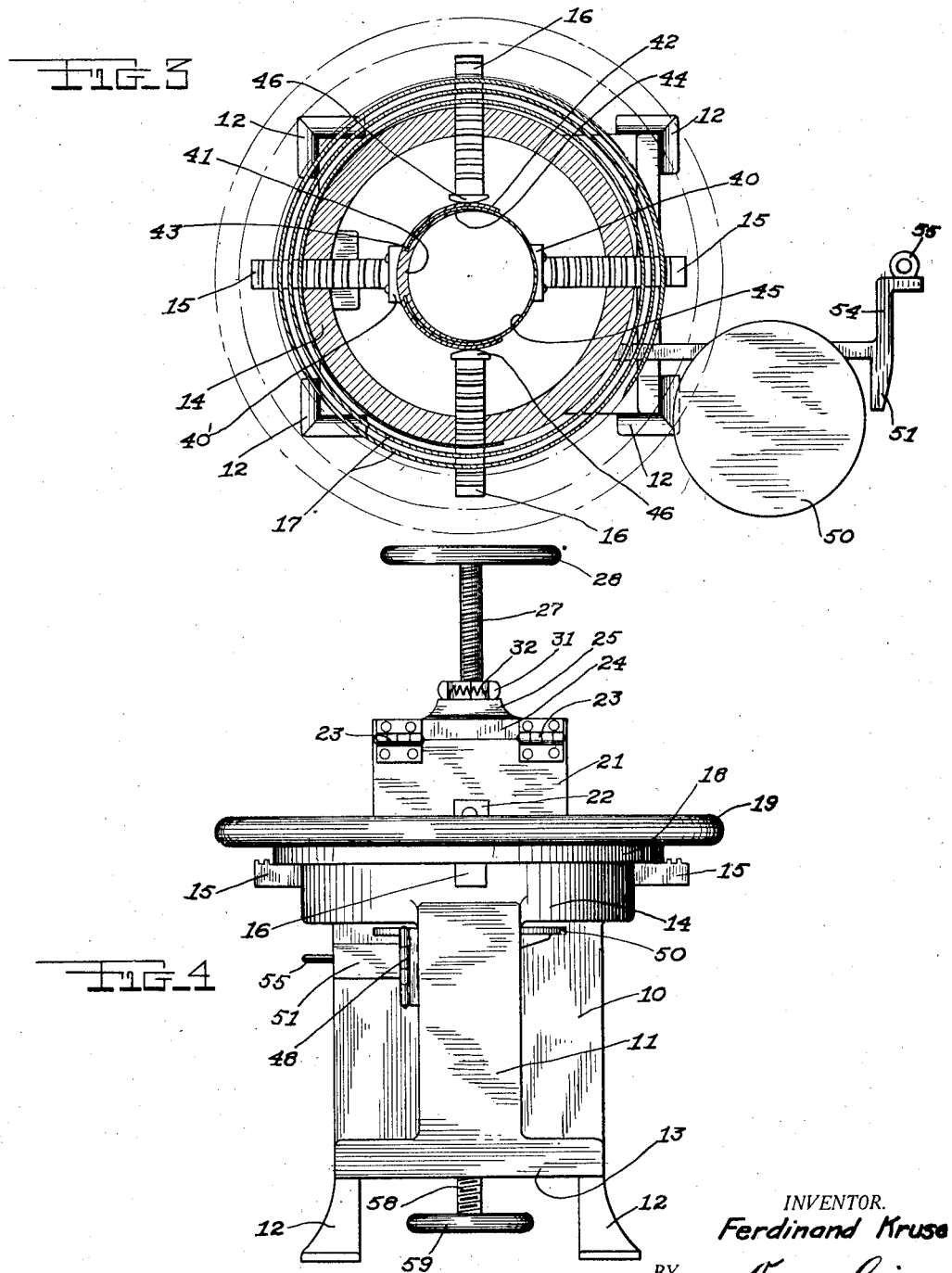
INVENTOR.
Ferdinand Kruse
BY
ATTORNEY.

UNITED STATES PATENT OFFICE.

FERDINAND KRUSE, OF NEW YORK, N. Y.

MEAT-PRESSER.

1,350,161.  Specification of Letters Patent.  Patented Aug. 17, 1920.

Application filed July 24, 1919. Serial No. 312,999.

*To all whom it may concern:*

Be it known that I, FERDINAND KRUSE, a citizen of the United States, residing at New York, county of New York, and State of New York, have invented certain new and useful Improvements in Meat-Pressers, of which the following is a specification.

This invention has for its principal object the provision of a machine in which cooked meats of various kinds and in varying conditions of substance, as chopped, ground, etc., may be compactly pressed into a cylindrical form in a rapid and practical manner.

A further object is to provide means, combined with the press, whereby the pressed meat is forced into a cylindrical can or container, all of the several operations being performed in an unusually rapid and effective manner and without contact by the hands of an operator.

These objects are attained by the novel construction, combination and arrangement of parts hereinafter described and shown in the accompanying drawings, forming a material part of this disclosure, and in which:—

Figure 1 is a top plan view showing a meat press made in accordance with the invention, looking on line 1—1 of Fig. 2.

Fig. 2 is a side elevational view of the same, parts being broken away in order to show the construction.

Fig. 3 is a transverse sectional view taken on line 3—3 of Fig. 2, and

Fig. 4 is a front elevational view of the assembled machine.

Referring to the drawings in detail, a pair of standards 10 and 11 are provided with bases 12 adapted to rest upon the floor, the standards being connected by a rigid platform 13, and joined at their tops by a relatively heavy annular ring 14.

Formed through the walls of the ring 14 are four equally spaced rectangular openings, and slidably mounted therein are opposed pairs of bars 15 and 16, having teeth upon their upper sides adapted to engage with spiral teeth or convolutions 17, extending downward from another ring 18, closely circumjacent to the ring 16, and provided with an endless rim or rail 19 of circular cross section adapted to operate in the manner of a hand wheel when grasped by an operator, and it will be apparent that upon rotating the rim 19 that the bars 15 and 16 may be moved in radial paths to or from the center of the apparatus.

Extending upward from the interior of the ring 14 are a pair of vertical plate-like posts, respectively 20 and 21, upon the outer surface of which are attached angular clip brackets 22, their extending elements making contact with the upper surface of the ring 18 so as to hold the teeth 17 in engagement with the teeth of the bars 15 and 16.

Engaged by a pair of hinges 23 to the top of the post 21, is a rectangular plate 24, having a raised central hub 25, bored to receive a plunger 26, secured to the end of a screw 27, having fixed upon its upper end an operating hand wheel 28 by which it may be rotated.

The threads of the screw 27 are engaged with a split nut 29, each part being independently pivoted upon bolts 30, extending downward through the hub 25, and formed with handle extensions 31 by which the split nut may be separated so as to free the screw 27, halves of the nuts being held normally in engagement with the screw by a coiled compression spring 32 engaged between the handle ends 31. In order to provide against the bolts 30 being disrupted, an overhanging bracket 33 is secured upon the plate 24, below which the outer portions of the split nut 18 engage when in a closed position.

Carried at the outer end of the plate 24 are a pair of lugs 34, in which, pivoted on the pin 35, is a lever 36, having an enlarged operating handle 37, the upper portion acting as a detent engageable below a pair of extending lugs 38, secured to the post 20. Thus the hinged plate 24, together with the screw and plunger may be secured firmly in position over the top of the mechanism or raised therefrom in a convenient manner.

Carried by the inner ends of the bars 15 are heads 40, 40' having concave inner faces and to the head 40' is rigidly engaged a curved former 41, having outwardly extending arms 42 each containing parti-circular recesses 43, the inner elements 44 of the arms being beveled to form thin knife-like edges.

These arm-like elements are formed of resilient material and extend vertically, at the center of the mechanism, in register with the axis of the screw 27.

Engageable in the recesses 43 formed in the arms 42 of the curved former 41, is a bent vertical plate 45, of highly resilient material, secured to the head 40 at the opposite side of the machine, so that the plate 45 and former element 41 may be moved to or from each other, and in order to assist in maintaining these elements in an essentially cylindrical position, other heads 46 are attached to the inner ends of the bars 16 making contact with the exterior of the arms 42 for that purpose.

Attached by hinges 48 to the standard 11, below the ring 14, is an arm 49 carrying a circular plate 50, the arm 49 having an extending angular projection 51, engageable in a recess 52, formed in the standard 10 so that the arm may rest upon the bracket-like extension 53 of the standard. Extending oppositely from the projection 51 is another projection 54 in which is secured an eye 55 adapted for manual operation, thus the arm together with the plate or table 50 may be swung into position below the elements 41 and 45, closely adjacent to their lower ends, the table being adapted to receive upon its upper surface the material to be pressed and which is thereafter pressed downward through the cylinder forming elements by a head 56 removably secured to the plunger 26 by the screw 57, it being thus possible to engage heads of different diameters.

A screw 58 passes upward through the platform 13, in register with the screw 27, the screw being provided with an operating hand wheel 59 at its lower end, and with a circular platform 60 at its upper end adapted to receive a cylindrical container 61, holding the same in register with the vertical center of the elements 41 and 45 when the same are in a closed position, so that when the table 50 is swung outwardly, as shown in Figs. 2 and 3, the compacted contents of the forming elements may be forced downward into the container by actuating the hand wheel 28.

In operation, the parts having been assembled in the manner indicated, the hand wheel 19 is turned in the direction to move the forming elements outwardly, the table 50 at that time being positioned centrally therebelow.

The meat to be canned is then placed upon the table 50, between the forming elements 41 and 45, in sufficient quantity to fill the container 61; the hand wheel 19 is then turned to bring the forming elements together, compressing the meat or other food therebetween upon the table 50. When the meat has been condensed and formed to a diameter to suit the can 61, the plate 50 is swung outwardly upon the hinges 48, the can or container 61 placed upon the platform 60 and raised by actuating the hand wheel 62 so as to come into close contact with the formers, whereupon the hand wheel 28 is rotated, forcing the plunger and head 56 downward through the formers, pressing the material held between into the container in an obvious manner. It is to be understood that the container may be made of any preferred material, as glass, tin or other metal.

When filling the formers, the plate 24 is raised on the hinges 23 so that the entire surface of the apparatus is free of obstructions, and if it be desired to quickly raise the screw 27, the handles 31 are pressed together, permitting the screw to rise through the threads in the half nuts without contact therewith, the plunger 26 acting as a guide for the screw at that time.

From the foregoing it will be seen that a serviceable and practical machine has been disclosed which may be readily operated and easily cleaned and that no hand operations so far as making contact with the meats, are necessary in compressing the same or in filling the container.

Having thus described my invention, what I claim as new, and desire to secure by Letters Patent, is:—

1. In a meat press, the combination with a pair of standards, a ring carried at the upper ends thereof, said ring having radial rectangular slots formed through its walls, bars slidably engaged in the recesses of said ring, teeth formed upon the upper side of said bars, a ring rotatably engaged upon the first named ring, manually operated means for actuating said second ring, spiral teeth formed upon the lower surface of said ring engageable with the teeth upon said bars whereby they may be moved, a pair of opposed formers secured to oppositely disposed bars, said formers being resilient and adapted to engage one within the other, and heads formed with the other pair of said bars adapted to make contact with said formers whereby they are held in a cylindrical form.

2. In a meat former, the combination with a frame, a ring supported thereby, said ring having four equally spaced rectangular openings formed through its walls, bars slidably engaged in said openings, teeth formed upon the upper surface of said bars, a second ring having spiral teeth rotatably mounted upon said ring, manually operable means for actuating said second ring, the teeth of said ring engaged with the teeth of said bars, a pair of opposed forming elements secured to opposed bars, said forming elements being interengageable one with the other presenting a circular interior, means for supporting said forming elements from the exterior engaged with the other pair of said bars, a plate hingedly engaged with one side of said frame adapted to swing under said forming elements, means for holding said plate when in engagement, and a pressure means adapted to extend downward through said forming elements compressing the meat upon said plate.

3. In a meat press, the combination with a frame comprising a pair of standards, a ring formed therewith, toothed bars extending radially through said ring, a second ring circumjacent to the first named ring, spiral teeth formed upon the lower side of said second ring and adapted to engage with the teeth of said bars whereby they are moved simultaneously to or from a common center, a pair of interengaging forming elements secured to opposed bars, said forming elements when in a closed position presenting a cylinder, means for reinforcing said forming elements carried by the other of said bars, a plate hinged over said frame, a plunger movable therein, a split nut pivoted on said plate, a screw operable therein, a hand wheel on said screw, and a head carried below said plunger, operable within said forming elements.

4. In a meat press, the combination with a frame, a ring supported thereby, a plurality of radial bars passing through said ring, means for manually actuating said bars to or from a common center, concave forming elements secured upon certain of said bars, said forming elements being interengaged and forming a cylindrical opening therebetween, reinforcing elements carried by other of said bars adapted to make contact with said forming elements, a table hinged in said frame adapted to swing below the opening between said forming elements, means for supporting said table opposite to the hinges thereof, a plate hinged over said ring, a plunger carried thereby, said plunger being adapted to operate within said formers, means for actuating said plunger, and means for the rapid return of said operating means.

5. In a combined press and canning machine, the combination with a frame, a ring supported thereby, radial arms operable in said ring, means for moving said arms to or from a common center, formers carried by said bars adapted to expand or contract and having a cylindrical interior, an arm hinged at one side of said frame and adapted to engage in the other side, a table carried by said arm adapted to be disposed below said formers, a pressure applying means carried by said frame over said formers, connections between said pressure applying means and said frame whereby it may be turned so as to present no obstruction to said formers, a platform adapted to receive a can, and means for raising said platform relative to said formers.

In testimony whereof I have affixed my signature.

FERDINAND KRUSE.